United States Patent
Howard et al.

(10) Patent No.: US 7,177,875 B2
(45) Date of Patent: Feb. 13, 2007

(54) SYSTEM AND METHOD FOR CREATING AND USING COMPUTER DATABASES HAVING SCHEMA INTEGRATED INTO DATA STRUCTURE

(76) Inventors: Robert S. Howard, 510 W. Almeria Rd., Phoenix, AZ (US) 85003; Michelle C. Howard, 510 W. Almeria Rd., Phoenix, AZ (US) 85003

( * ) Notice: Subject to any disclaimer, the term of this patent is extended or adjusted under 35 U.S.C. 154(b) by 6 days.

(21) Appl. No.: 10/901,533

(22) Filed: Jul. 28, 2004

(65) Prior Publication Data
US 2005/0102314 A1    May 12, 2005

Related U.S. Application Data

(60) Provisional application No. 60/519,014, filed on Nov. 10, 2003.

(51) Int. Cl.
*G06F 17/30* (2006.01)
(52) U.S. Cl. .......................................... 707/100; 707/6
(58) Field of Classification Search .............. 707/1–10, 707/100–104.1, 200–205
See application file for complete search history.

(56) References Cited

U.S. PATENT DOCUMENTS 5,253,361 A * 10/1993 Thurman et al. .............. 707/3
6,442,565 B1 * 8/2002 Tyra et al. .................. 707/102

* cited by examiner

*Primary Examiner*—Mohammad Ali
(74) *Attorney, Agent, or Firm*—Robert D. Atkins; Quarles & Brady LLP

(57) ABSTRACT

A symmetric objects database contains a plurality of data cells. Each data cell has a plurality of data fields which are the same or similar for each of the data cells. The data fields include an identifier field, name field, value field, signature field, classes field, children field, versions field, user ID field, date field, and control flag field. A first data cell is related or linked to a second data cell which is higher in database hierarchy than the first data cell. The linking is done through the classes field within the first data cell which contains the identifier of the second data cell. A third data cell is related or linked to a fourth data cell which is lower in database hierarchy than the second data cell. The linking is accomplished through the children field which contains the identifier of the fourth data cell. A versions field keeps track of historical changes to the database. The later version of a data cell links to the identifier of an earlier version of the data cell. The data fields within each data cell provide for a schema which is integrated into the data structure.

8 Claims, 5 Drawing Sheets

| ID | NAME | VALUE | CLASSES | CHILDREN | VERSIONS | USERID | DATE | FLAGS |
|---|---|---|---|---|---|---|---|---|
| 1 | SUBJECT MATTER | | | | | 31 | 7/7/04 | |
| 2 | VACATION TRAVEL | | 1 | | | 31 | 7/8/04 | |
| 3 | CRUISES | | 2 | | | 31 | 7/9/04 | |
| 4 | FOREIGN | | 2 | | | 31 | 7/10/04 | |
| 5 | PETS | | 1 | | | 31 | 7/11/04 | |
| 6 | DOGS | | 5 | | | 31 | 7/12/04 | |
| 8 | TITLE | | | 1,8 | | 31 | 7/13/04 | |
| 9 | BOOK | | | | | 31 | 7/14/04 | |
| 11 | (TITLE) | CARIBBEAN CRUISES | 8 | 3,11 | | 31 | 7/15/04 | |
| 12 | (BOOK) | | 9 | | | 31 | 7/16/04 | |
| 13 | (TITLE) | WEIMARANERS | 8 | 6,13 | | 31 | 7/17/04 | |
| 14 | (BOOK) | | 9 | | | 31 | 7/18/04 | |
| 15 | PERSON | | | | | 31 | 7/19/04 | |
| 16 | SSN | | | | | 31 | 7/20/04 | |
| 17 | AUTHOR | | 15 | | | 31 | 7/21/04 | |
| 18 | EMPLOYEE | | 15 | 16 | | 31 | 7/22/04 | |
| 19 | (TITLE) | GERMANY | 8 | | | 31 | 7/23/04 | |
| 20 | (BOOK) | | 9 | 4,19 | | 31 | 7/24/04 | |
| 21 | (AUTHOR) | JONES | 17 | 14 | | 31 | 7/25/04 | |
| 22 | (AUTHOR) | SMITH | 17 | 12,20 | | 31 | 7/26/04 | |
| 23 | (SSN) | 123-45-6789 | 16 | 23,28 | | 31 | 7/27/04 | |
| 24 | (EMPLOYEE) | WILSON | 18 | | | 31 | 7/28/04 | |
| 25 | (SSN) | 987-65-4321 | 16 | 25 | | 31 | 7/29/04 | |
| 26 | (EMPLOYEE) | JEFFERSON | 18 | | | 31 | 7/30/04 | |
| 27 | ASSET | | | | | 31 | 7/31/04 | |
| 28 | COMPUTER | | 27 | | | 31 | 8/1/04 | |
| 29 | (TITLE) | CARIBBEAN FAMILY CRUISES | 8 | | 11 | 31 | 8/2/04 | |
| 30 | (BOOK) | | 9 | 3,29 | 12 | 31 | 8/3/04 | |
| 31 | DBM | [PUBLIC KEY] | | | | 31 | 8/4/04 | |

FIG. 3

SYSTEM AND METHOD FOR CREATING AND USING COMPUTER DATABASES HAVING SCHEMA INTEGRATED INTO DATA STRUCTURE

CLAIM TO DOMESTIC PRIORITY

The present invention claims priority to provisional patent application 60/519,014, entitled "Symmetric Objects Database Structure" and filed Nov. 10, 2003.

FIELD OF THE INVENTION

The present invention relates in general to computer database structures and, more particularly, to a system and method for creating and using computer databases having a schema which is integrated into the data structure.

BACKGROUND OF THE INVENTION

Computer databases have long been used to conveniently and efficiently organize, store, and access vast amounts of information and data. Any business or organization that finds it necessary to work with large amounts of data often makes use of computer systems configured with one or more databases. Databases are essential to managing large amounts of data in an efficient and meaningful manner. Data comes in a myriad of formats, content, relationships, and applications. Databases can be used to store information related to the fields of accounting, financial records, banking, manufacturing, inventory, distribution, business records, human resources, customer information, health care, medical records, biotechnology, and government records, just to name a few.

The structure of known databases range from simple 2-dimensional flat files to more complex relational databases. A flat file typically contains a number of records and a fixed number of fields per record, each field having a value stored therein. The records may be fixed or variable in length. In a simple customer contact database, using a flat file format, each record may contain customer name, address, phone number, and e-mail address. There is one record for each customer. In order to search the flat file database, the system typically begins at the first record and examines the records one by one until the desired information is found. In most cases, there is no relationship between different records of the flat file database. Flat files are useful for a relatively small number of records and limited amount of information per record. For flat files with many records, one or more supporting index files may exist to decrease the searching time.

In other applications, which require a larger number of records and more information per record, flat files become impractical. Relational databases are better suited for larger, more complex interrelated information systems. Common relational database products are SQL Server, Access, and Oracle Database. A relational database may contain several files, each having a different structure, which are related by linkages. Each file may have its own unique format, and the files will differ in content, scope, organization, and structure. In the banking business, each customer will have personal information and financial records stored in a number of accounts. The customer may have accounts for checking, savings, loans, credit cards, investments, etc. In a simple example, customer A has a main record and several different account records. Each account record contains a link to the main account. The identification number is the link or relation between the main record and the individual account records. Actual banking databases will have much more complex relational databases and interrelated data structures.

The data structure of a relational database must be defined and created before it can be used. The definition of the data structure is known as the schema of the database. A computer program uses the schema to build the basic database file structures and interrelationships between the many different data file structures. Another set of application software and computer programs is written and customized to the specific database structure, as defined by the schema, to manage the data in the database. The application software is used to store data in the database, search for data in the database, retrieve previously stored information, and update information. The relational database uses organizational techniques such as hashing and B-trees, to efficiently find specific records and retrieve the desired information. The application software is designed to function with only specific or similar schema structures.

Relational databases are for the most part rigid in terms of structure and usage. For example, each customer account record will have a specific format with fields for the respective informational content, as defined by the schema. The various customer account records or database files will each have their own custom structure, according to the information related to the account. A checking account record may contain fields for account number, date, check number, transaction number, amount, payee, etc. If the bank decides it needs to add another field to the checking account record, say to comply with a new banking regulation or to offer a new service to the customer, then the schema may have to be redefined and the data structure reformatted to accommodate the new field. Moreover, the application software would have to be modified or rewritten to read, write, and search with respect to the new data field and perform the necessary computations and reporting functions using the new data field.

The magnitude of the task necessary to make such changes to existing relational database structures can be enormous in terms of time and cost. The database may have to be taken off-line to make the changes, which often cause disruption to daily operations. The changes must be thoroughly tested to confirm the integrity of the modified system. Nonetheless, given the complexity of large databases, any revision creates the real opportunity for mistakes in the new structure, relationships to prior structures, and application software code. Many times the mistakes are not found until after costly errors are detected during normal operations, sometimes as a result of customer complaints, which is an undesirable outcome. The reality is that database administrators rarely welcome changes to known working systems and often hold their breath as the system comes back on-line.

The problem can be magnified by major system changes to the database. In most cases, each bank has its own custom database structure and application software. If two banks merge, then one database system is usually converted to become compatible with the other. This type of integration is extremely complex. Not only will the database structures be different, but information content per field may be incompatible. For example, one bank may use one field for the transaction number with a given format. Another bank may split the transaction identifier into multiple fields with an entirely different format. Specialized programs have to be written to perform the conversion with careful processing and consideration of many special circumstances. The opportunity for problems is high, and major database conversions are rarely error-free. Patches to correct previous mistakes can introduce additional errors. The error detection process and fine-tuning can go on for some time until the new database has regained its previous level of data integrity and error-free operation.

Another problem for relational databases is the potential for covert, intentional, and unintentional corruption of data. While many databases have some form of security screen surrounding data, most data security systems are still vulnerable. Hackers have been known to gain access. In general, it is difficult to detect intentional corruption of data solely by examining the records themselves. New information replaces the prior information and the history is lost. While databases are routinely backed-up, the recovery process is time consuming and costly. Problems are detected only some time after the corrupting event.

A need exists for a new database structure which is easy to maintain, repeatable, expandable, transportable, and maintains historical information.

SUMMARY OF THE INVENTION

In one embodiment, the present invention is a computer implemented method of forming a symmetric objects database comprising providing a plurality of data cells, each data cell having a plurality of data fields which are similar for each of the plurality of data cells, relating a first one of the plurality of data cells to a second one of the plurality of data cells, wherein the second one of the plurality of data cells is higher in database hierarchy than the first one of the plurality of data cells, and relating a third one of the plurality of data cells to a fourth one of the plurality of data cells, wherein the fourth one of the plurality of data cells is lower in the database hierarchy than the third one of the plurality of data cells.

In another embodiment, the present invention is a method of organizing data in a symmetric objects database comprising providing a plurality of data cells, each data cell having a plurality of data fields which are similar for each data cell, relating a first data cell to a second data cell which is higher in database hierarchy using a first one of the data fields, and relating a third data cell to a fourth data cell which is lower in the database hierarchy using a second one of the data fields.

In another embodiment, the present invention is a method of providing a symmetric objects database comprising providing a plurality of data cells, wherein each data cell has a plurality of data fields which are similar for each data cell, and relating data cells in different levels of database hierarchy using values in the data fields.

In another embodiment, the present invention is a database structure comprising a plurality of data cells, wherein each data cell has a plurality of data fields which are similar for each data cell. A first link between first and second data cells, as defined by a first one of the data fields, relates the first data cell to the second data cell which is higher in database hierarchy. A second link between third and fourth data cells, as defined by a second one of the data fields, relates the third data cell to the fourth data cell which is lower in the database hierarchy.

In another embodiment, the present invention is a database structure comprising a plurality of data cells, wherein each data cell has a plurality of data fields which are similar for each data cell. A plurality of links relates data cells in different levels of database hierarchy using values in the data fields.

BRIEF DESCRIPTION OF THE DRAWINGS

FIG. 3 illustrates data for a symmetric objects database for a book publisher;

DETAILED DESCRIPTION OF THE DRAWINGS

Figure 1:
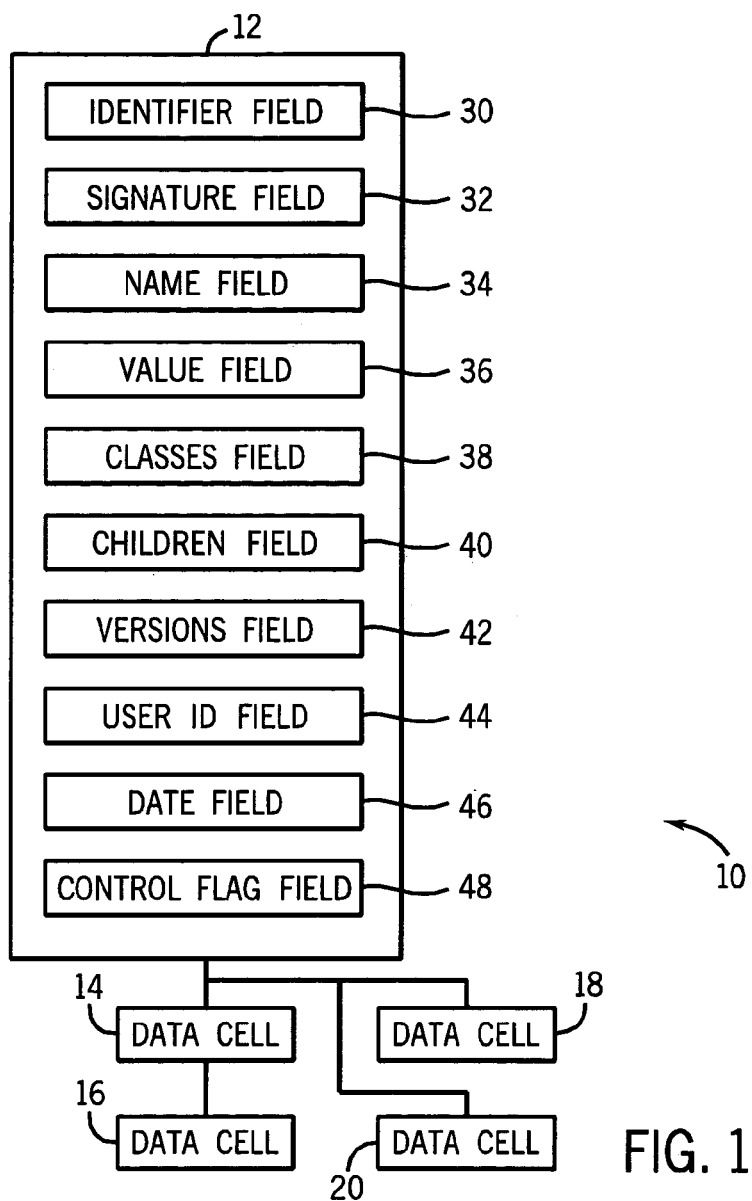
FIG. 1 illustrates a data structure of the symmetric objects database.

The present invention is described in one or more embodiments in the following description with reference to the Figures, in which like numerals represent the same or similar elements. While the invention is described in terms of the best mode for achieving the invention's objectives, it will be appreciated by those skilled in the art that it is intended to cover alternatives, modifications, and equivalents as may be included within the spirit and scope of the invention as defined by the appended claims and their equivalents as supported by the following disclosure and drawings.

In the present discussion, a novel database structure is used to store virtually any type of data. The database structure is referred to as the Symmetric Objects Database (SODB). The SODB is applicable to financial records, manufacturing records, government records, business records, medical records, personnel records, and any other type of data or information that must be organized for ready and efficient storage, searching, and retrieval. The database is symmetrical because all individual objects or records contain the same or similar base structure. The linkage between individual objects or records is accomplished using common data fields within each data record. While each database implementation using the SODB format will be different in its overall structure, the fundamental building blocks and method of interrelating the building blocks will be the same across all SODB applications.

In one embodiment, the data is organized using one or more logical record structures or data cells. The data cells all conform to the same basic building block structure. Each data cell contains a number of data fields, each of which has specific purpose and function. In one embodiment, the data fields are: identifier, signature, name, value, classes, children, versions, user ID, date, and control flag. Since each data cell has the same or similar set of data fields, the data structure is generic, expandable, and transportable.

Each data cell has the ability to identify itself, store data, link up in the inheritance database hierarchy, link down in the composition database hierarchy, and link laterally in time to different historical versions of the data cell. The higher (up) are one form of database hierarchy, called the "classes" hierarchy; the lower (down) links are another form of database hierarchy, called the "children" hierarchy; and the lateral (left) links are a third form of database hierarchy, called the "versions" hierarchy which relate different versions of data from different times.

Each of the three hierarchies is a directed acyclic graph (DAG). In a DAG, the links are unidirectional, or one-way (hence "directed"), which forbids "round trips"; and that cycles cannot exist (hence "acyclic"), which means one cannot start from any one cell and follow one or more links that return to the starting cell. No additional code is necessary to enforce these two rules of the DAG. The fact that each cell's identifier is dependent on the cell's data (including the links) automatically enforces the rules.

The SODB data cells are related to one another using the up, down, and lateral linkages provided within the common data fields of the data cell to create an overall custom structure for the database application. While the structure of each data cell is similar, the interrelating links between data cells provides the overall unique structure for the SODB. The data fields provide the linkages between data cells according to the database hierarchy. The structural linkages within the data fields of each data cell of the symmetric objects database provide the schema, which is integrated into the data structure. The overall data structure (the logical schema) of the SODB can adapt and evolve as new data cells are added to the mix, without changing the physical schema of the database.

The identifier field is a secured, unique, one-way, asymmetric cryptographic hash of cell data. The cell data is the contents of the other fields in the data cell, excluding the identifier and signature fields. The identifier is a string of unsigned bytes that holds the unique primary key of the data cell. Examples of the hashing algorithm include Secured Hash Algorithm (SHA-1), Race Integrity Primitives Evaluation Message Digest (RIPEMD), and Message Digest version 5 (MD5). In direct contrast to that which standard relational database modeling recommends, the identifier field is absolutely dependent on its underlying data, and consequently becomes globally unique and immutable. By guaranteeing that identifiers are globally unique and immutable, independently developed databases can be automatically merged without chance of conflict, and existing databases can be automatically partitioned across a distributed set of database servers for scalability, redundancy, fault-tolerance, and archiving. The partitioning algorithm may be performed by splitting the identifier space into a radix tree that selects one or more bits from the cell identifiers, where each bit selected doubles the number of children in the tree. In contrast to an LH* Extended Linear Hash, a radix-like B-Tree may be used instead, which does not require the entire 20-plus bytes of the identifier to be stored on each disk page, but rather only a segment of identifier bits, e.g. 11 bits.

The signature field is a string of unsigned bytes that represent the digital signature for the data cell. The signature field contains a digital cryptographic code produced by the owner who is creating the data cell. The signature can be generated by standards such as Rivest Shamir Adleman (RSA), Pretty Good Privacy (PGP), Digital Signature Algorithm (DSA), and Elliptic Curve Cryptography (ECC). The signature authenticates and validates the data cell. While the signature field can be null, a digital value in the field helps maintain the integrity of the database. Others can read and confirm the signature but cannot alter it.

The name field is a string of unsigned arbitrary bytes, chosen by the user or creator, and containing a human-readable description of the data cell. This name value can be UNICODE encoded as UTF-8.

The value field is an arbitrary string of bytes that can be specific text or a numeric value associated with the name field. The value field of the data cell may be null. Machine-executable code can also be stored in the value field. This code will represent various cryptographic algorithms, application-specific rules, common library classes, integrity constraints, validation checks, and functions that convert data from one classification scheme to another; e.g. from Fahrenheit to Celsius, from French to German, and from European date formats to American date formats.

The classes field may contain one or more identifiers of other data cells, each identifier having a variable length of bytes, e.g., 20 bytes. Each identifier represents another data cell that defines the class of the subject data cell. For example, if the classes field of a data cell contains the value 1, then that data cell would belong to the general class of data cells defined by the data cell having an identifier of value 1. The data cell having identifier 1 is considered the parent class or super class member of the subject data cell. Accordingly, the classes field contains an identifier which points up in the inheritance database hierarchy from the present data cell to a higher level data cell. The classes field provides the linkage or relation to higher level data cells in the class or database hierarchy. The classes field forms a DAG that models multiple inheritance for all cells regardless of whether the external applications interpret these cells to be classes, objects, or properties.

The children field may contain one or more identifiers of other data cells, each identifier having a variable number of bytes. Each identifier represents another data cell that has attributes of the subject data cell. If the children field of a data cell contains the value 8, then that data cell would have attributes defined by the data cell having an identifier of value 8. The data cell having identifier 8 is considered the child or attribute of the subject data cell. Accordingly, the children field contains an identifier, which points down in the composition database hierarchy to the child data cell. The children field provides the linkage or relation to lower level data cells in the database hierarchy. The children field forms a DAG that models multiple compositions for all cells. A cell can have many parents, as well as many children. A distributed form of delegated security access will also be modeled in the framework of the SODB database using the composition hierarchy created by the children field.

The versions field may contain one or more identifiers of other data cells, each identifier having a variable number of bytes. The versions field is used to track historical changes to the SODB. When a data cell is created, its contents do not change. Since the identifier is a hashed value of the data within the cell, any change to the cell data would invalidate the identifier. If a value in the database must be modified, then a new data cell is created with the new values. In the new data cell, the versions field is given the value of the identifier of the prior version of the data cell. The new data cell links back in time to the earlier data cell using the versions field. The contents of the versions field in the new data cell is the link to the identifier of the earlier data cell. The version field forms a DAG that models multiple version splits and version joins for all cells. Consequently, a cell can be modified asynchronously by many users and automatically merged back into the database. Versioning forms an audit trail of all changes to the database. This strategy allows multiple versions of application code and data to exist simultaneously without conflicts, and prevents top-down changes from breaking existing applications.

The user ID or creator field is a link to a cell that represents the person that created the data cell. The user may be the database manager (DBM) or another authorized user. The cell that represents the user will define the many attributes specific to the user including which cryptographic algorithms the user has chosen, and whether the cells created by the user are to be treated as copyrighted and/or licensed.

The date field defines a unique set of bytes for the present date and time. It can be defined with 8 or more bytes to model the current time the data cell is created, e.g., using Greenwich Mean Time (GMT). The 8 bytes are defined as follows: byte 0 . . . 1 is the current year from 0 to 65535, byte 2 is the current month from 01 to 12, byte 3 is the current day from 01 to 31, byte 4 is the current hour from 00 to 23, byte 5 is the current minute from 00 to 59, byte 6 . . . 7 is the milliseconds from 0 to 59999, and byte 8 . . . n is optional user-defined value. The date field can also be defined as an unbounded floating-point representation of the Julian Date and Time (i.e. the number of days since Jan. 1, 4713 B.C.). Trusted timestamping servers can use this field to notarize child cells.

The control flag field is optional and used for a variety of purposes. The control flag may be used for database control flags such as Inferred flag and Ordered flag. The Inferred flag is a Boolean value, i.e., TRUE or FALSE. If TRUE, then each identifier in the classes field refers to a sub class of the data cell. If FALSE, the identifier in the classes field refers to a super class. The Ordered flag is a three-valued Boolean, i.e., TRUE, FALSE, or UNDEFINED. If TRUE, the bytes in the value field are assumed to be of an ordered type, and consequently, a B-tree can be used to access its values. If FALSE, then only a hash can be used. If UNDEFINED, then the value field bytes never appear in an index.

In the normal sequence of creating a data cell, data is placed in the data fields of the record or cell, the identifier is generated from a hash of the cell data, and then the signature is stamped to authenticate and validate the data cell. After that point, the data cell and its contents become fixed and cannot be changed. Consequently, the data cell can never be altered, forged, or corrupted.

In FIG. 1, the basic structure of SODB 10 is shown. Data cell 12 is logically connected or linked to data cell 14. Likewise, data cell 14 is logically connected or linked to data cell 16. Data cells 18 and 20 are each linked to data cell 12. Data cells 12–18 are arranged in a hierarchy database format. In SODB 10, data cell 12 is hierarchically above data cells 14, 18, and 20. Data cell 16 is hierarchically below data cell 14. Data cells 14, 18, and 20 may be the same level in the database hierarchy or completely unrelated.

Data cells 12–20 each contain the same or similar internal structure or format. That is, data cells 12–20 each contain the same or similar set of data fields. As will be shown, the data fields provide the linkages between data cells within the database hierarchy. In one embodiment, data cells 12–20 contain identifier field 30, signature field 32, name field 34, value field 36, classes field 38, children field 40, versions field 42, user ID field 44, date field 46, and control flag field 48. Additional data cells can be added to SODB 10 and linked to another data cell. The structural linkages within the data fields of each data cell of the symmetric objects database provide the schema which is integrated into the data structure.

For the present discussion, SODB 10 is explained using a simplified database structure for a book publisher business. The book publisher database is given by way of example to aid in understanding the present invention. It is understood that an actual commercial database will follow a similar base structure and approach, and will contain more records and information.

The book publisher database tracks the following information: products, books, authors, employees, and assets. Products are all things sold by the book publisher. All products have a name. Books are a specific type of product. All books have a title and an International Standard Book Number (ISBN) number. Authors are people with names who write books. Employees are people with names who work for the publisher. All employees have a social security number (SSN). Assets are things that employees use to do their job. Assets are owned by the book publisher. All assets have a description.

For the simplified example, assume the book publisher's inventory includes the following products: two books written by author Smith, and one book written by author Jones. The book publisher has two employees: Wilson in sales and Jefferson is shipping. The assets of the book publisher includes one computer system which contains SODB 10.

Figure 2:
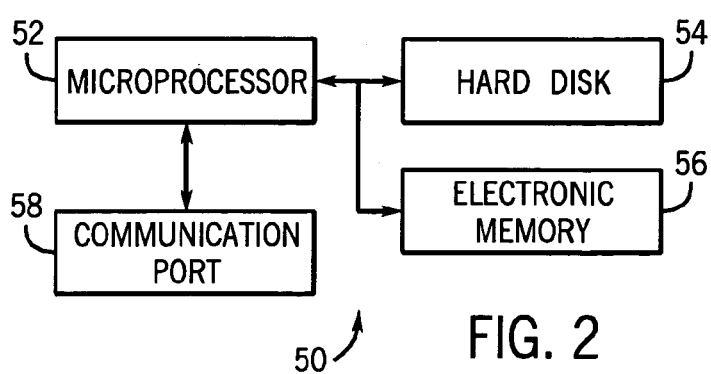
FIG. 2 illustrates a computer system containing the symmetric objects database and application software.

A general purpose computer 50, as shown in FIG. 2, includes central processing unit or microprocessor 52, mass storage device or hard disk 54, electronic memory 56, and communication port 58. Hard disk 54 contains SODB 10 and the software used to manage the database. Computer 50 may be part of a distributed computer network which connects to other computer systems and mass storage devices. SODB 10 may be distributed across a larger computer system.

In one embodiment, computer system 50 contains the data structures of SODB 10 and the application software or computer programs used to create it and manage its contents. The software adds data cells, deletes data cells, searches for data, and retrieves the data for the users. The software can arrange the retrieved data in a meaningful format or report for the user. The software is originally provided on computer readable media, such as compact disks (CDs), or downloaded from a vendor website, and installed on the desired computer. In one case, SODB 10 can be executed directly on computer 50, which may be located in the user's facilities. Alternatively, the user accesses SODB 10 remotely through communication port 58 using another computer system.

Assume for the present example that the books written by Smith are generally directed to subject matter of vacation travel: one entitled "Caribbean Cruises" and one entitled "Germany". The book written by Jones is generally directed to the subject matter of pets, more specifically to dogs, and entitled "Weimaraners". Employee Wilson who works in sales has SSN 123-45-6789; employee Jefferson who works in shipping has SSN 987-65-4321. Again, the assets of the book publisher include one computer-system.

The above data to be entered as records or data cells into SODB 10 is shown in the table of FIG. 3. A first data cell 60 is created in SODB 10. Name field 34 in data cell 60 is assigned a value "subject matter". Value field 36 is assigned a null value (blank). Classes field 38 is assigned a null value because it has no parent or higher level in the data hierarchy. Children field 40 is assigned null value. Versions field 42 is assigned a null value. User ID field 44 is assigned numeric value 31, which links to cell 116 that represents the person that created data cell 60. Date field 46 is assigned a value for the present date. Control flag field 48 is assigned a null value. The data fields 34–48 are hashed to generate the identifier field 30. To simplify the explanation, the identifier of data cell 60 is hashed to a value of 1. The table in FIG. 3 shows data cell 60 in SODB 10, less the signature field 32 which is not shown in the table of FIG. 3 to simplify the presentation, but exists in each data cell and would contain the user's digital signature, where the user is denoted by the user ID field.

A second data cell 62 is created in SODB 10. Name field 34 in data cell 62 is assigned a value "vacation travel". Value field 36 is assigned a null value denoted by a blank. Classes field 38 is assigned the value 1 because it is within the class defined by data cell 60. The value of 1 in classes field 38 of data cell 62 is the identifier of the parent data cell, i.e., data cell 60. Data cell 60 is relatively higher in the database hierarchy with respect to data cell 62. Children field 40 in data cell 62 is assigned null value; versions field 42 is assigned null value; user ID field 44 is assigned numeric value 31 for the user's ID; date field 46 is assigned a value for the present date; control flag field 48 is assigned a null value. The data fields 34–48 of data cell 62 are hashed to generate the identifier field 30. The identifier field 30 of data cell 62 is hashed to a value of 2. The table in FIG. 3 shows data cell 62 in SODB 10.

A third data cell 64 is created in SODB 10. Name field 34 in data cell 64 is assigned a value "cruises". Value field 36 is assigned a null value. Classes field 38 is assigned the value 2 because it is within the subclass defined by data cell 62. The value of 2 in classes field 38 of data cell 64 is the identifier of the parent data cell, i.e., data cell 62. Data cell 62 is relatively higher in the database inheritance hierarchy with respect to data cell 64. Children field 40 in data cell 64 is assigned null value; versions field 42 is assigned null value; user ID field 44 is assigned numeric value 31 for the user's ID; date field 46 is assigned a value for the present date; control flag field 48 is assigned a null value. The data fields 34–48 of data cell 64 are hashed to generate the identifier field 30. The identifier field 30 of data cell 64 is hashed to a value of 3. The table in FIG. 3 shows data cell 64 in SODB 10.

The process continues to enter the records or data cells 66, 68, 70, 72, 74, 76, 78, 80, and 82 in SODB 10 as shown in FIG. 3. Notably, data cell 74 with identifier 9, having name field 34 of "book", shows its children field 40 with values 1 and 8. The children of data cell 74 are data cells 60 and 72 with identifiers 1 and 8, i.e., "subject matter" and "title", which are relatively lower in the database spatial hierarchy with respect to data cell 74. Thus, data cell 74 has child attributes defined by data cells 60 and 72, i.e., a book has attributes that it contains certain subject matter and it has a title. Accordingly, the children field 40 of data cell 74 points down in the database spatial hierarchy and, for the present record, relates or links data cell 74 to data cells 60 and 72, which are relatively lower in the database hierarchy.

Also note that data cell 78 has name field 34 of value "(book)". Data cell 78 shows its classes field 38 with value 9 and its children field 40 with values 3,11. From the classes field, the parent record is data cell 74, i.e., data cell 78 belongs to the subclass of data cells defined by the parent data cell 74. The value "(book)" in the name field 34 of data cell 78 indicates that its name field assumes or defaults to the value of the name field of the parent record. Accordingly, the classes field 38 points up in the database hierarchy and, in for the present record, relates or links data cell 78 to data cell 74. The children of data cell 78 are data cells 64 and 76, i.e., "cruises" and "(title)". Data cell 78 has attributes defined by data cells 64 and 76, i.e., a book has attributes that it contains subject matter related to cruises under vacation travel and it has a title. The title is given in value field 36 of data cell 76 as "Caribbean Cruises".

Data cell 80 has parent data cell 72, which is title. Data cell 82 has parent data cell 74, with identifier 9, and children data cells 70 and 80, with identifiers 6 and 13, respectively. The title is given in value field 36 of data cell 80 as "Weimaraners".

Data cell 84 has name field 34 with value "person" and identifier value 15. Data cell 86 has name field 34 with value "SSN" (social security number) and identifier value 16. Data cell 88 has name field 34 with value "author", classes field 38 with value 15, and identifier value 17. Data cell 88 belongs to the class defined by data cell 84, i.e., author is a person. Data cell 90 has name field 34 with value "employee", classes field 38 with value 15, children field 40 with value 16, and identifier 30 with value 18. Data cell 90 belongs to the class defined by data cell 84, i.e., employee is a person. Data cell 90 has attributes defined by data cell 86, i.e., employee has a social security number.

Data cell 92 has name field 34 defaulting to the value of the name field 34 in parent data cell 72 according its classes field 38 having a value of 8. Data cell 92 has identifier value 19. Data cell 94 has name field 34 of "(book)" and classes field 38 having a value of 9. Data cell 94 has children field 40 with values 4 and 19, and identifier value 20. Data cell 92 defines a title of a book as "Germany" under foreign vacation travel subject matter.

Data cell 96 has name field 34 of "(author)", value field 36 of "Jones", classes field 38 of value 17, and children field 40 of value 14. Data cell 96 identifies Jones as an author belonging to the class defined by data cell 88. Jones has a book entitled "Weimaraners" by nature of the link in the children field 40 to data cell 82 and the link in the children field 40 of data cell 82 to data cell 80. Data cell 98 has name field 34 of "(author)", value field 36 of "Smith", classes field 38 of value 17, and children field 40 of value 12 and 20. Data cell 98 identifies Smith as an author belonging to the class defined by data cell 88. Smith has books entitled "Caribbean Cruises" and "Germany" by nature of the links in the children field 40 to data cells 78 and 94 and the links in the children field 40 of data cell 78 and 94 to data cells 76 and 92, respectively.

Data cell 100 has name field 34 defaulting to "SSN" from parent data cell 86, value field 36 of "123-45-6789", and classes field 38 of value 16. Data cell 102 has name field 34 of "(employee)", value field 36 of "Wilson", classes field 38 of value 18, and children field 40 of values 23 and 28. Wilson is an employee with the given SSN. Wilson also has a computer asset as defined in data cell 110 under his/her name. Data cell 104 has Data cell 104 has name field 34 defaulting to "SSN" from parent data cell 86, value field 36 of "987-65-4321", and classes field 38 of value 16. Data cell 106 has name field 34 of "(employee)", value field 36 of "Jefferson", classes field 38 of value 18, and children field 40 of value 25. Jefferson is an employee with the given SSN.

Data cell 108 has name field 34 with value "asset" and identifier value 27. Data cell 110 has name field 34 with value "computer" and classes field 38 with value 27, and identifier value 28.

SODB 10 has thus been created for the inventory, employees, and assets of the book publisher. When it becomes necessary to change SODB 10, the modified data is added as a new data cell and linked back to the earlier version of the corresponding data by using versions field 42. Say the book title in data cell 76 needs to be changed to "Caribbean Family Cruises". The contents of data cell 78, which include the identifier of cell 76 in the children field 40 of cell 78, cannot change, because identifier 11 has been hashed from the original contents and would become invalid if the value of any data field 34–48 changed. Instead new data cells 112 and 114 are added to SODB 10. The versions field 42 in new data cells 112 and 114 point back, earlier in time, to data cells 76 and 78, respectively. The linkage between data cells 112 and 114 and data cells 76 and 78 is temporal, which is another form of database hierarchy. The temporal linkage is provided through the versions field 42 between the data cells. However, data cells 76 and 78, although outdated, are preserved and a historical record of all updates to SODB 10 is maintained.

Data cell 116 has name field 34 with value "DBM", value field 36 with public key code, and identifier value 31. Data cell 116 defines the user ID from user ID field 44.

Figure 4:
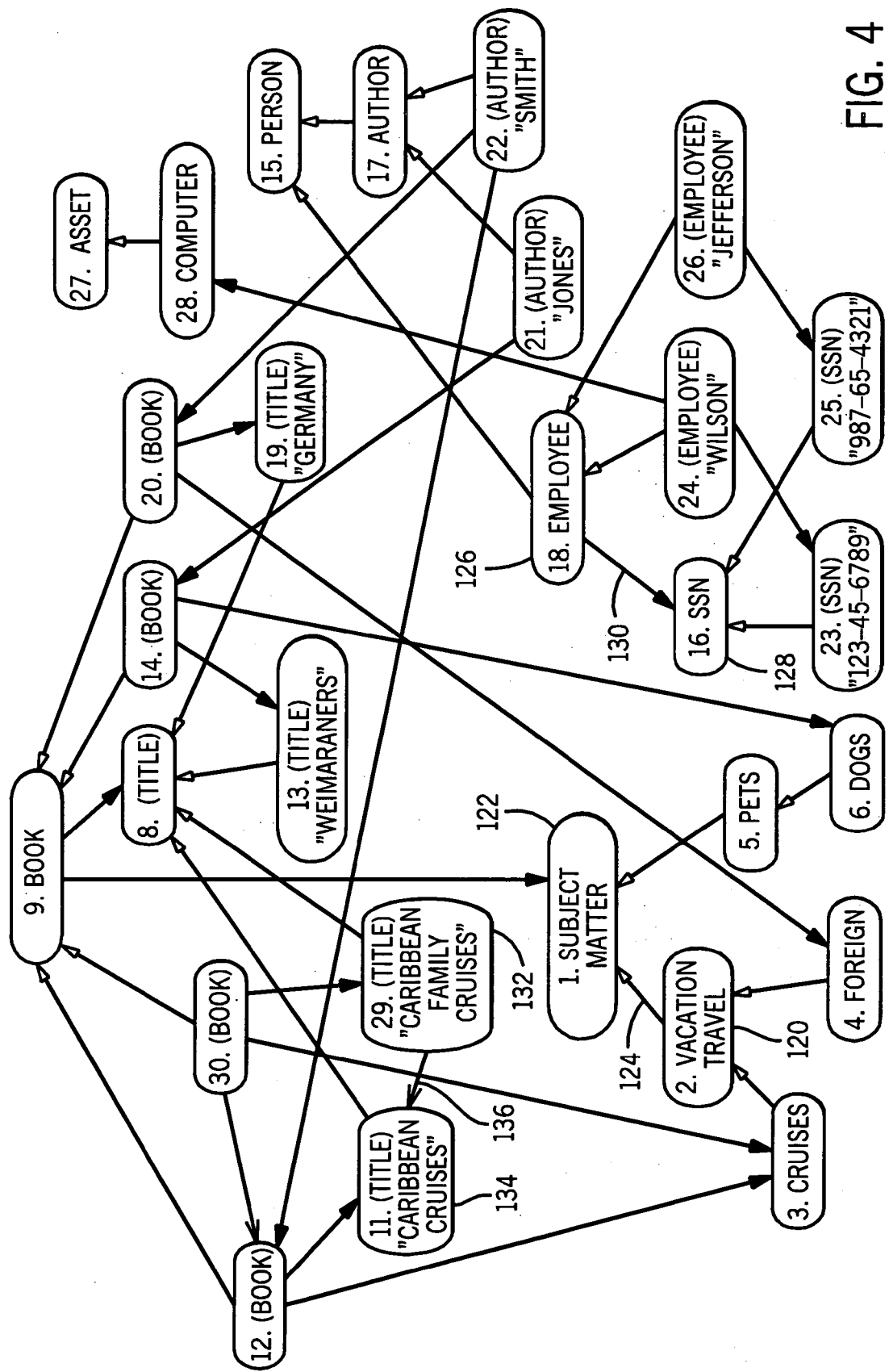
FIG. 4 illustrates hierarchical structure for the symmetric objects database using the data from FIG. 3.

FIG. 4 graphically illustrates the hierarchical structure of the data from the table of FIG. 3. For example, data cell 120 ("Vacation Travel") links up or relatively higher in the inheritance database hierarchy using its classes field with respect to data cell 122 ("Subject Matter"). Data cell 120 is within the class hierarchy defined by data cell 122. Link 124 is provided by classes field 38 in data cell 120 containing the identifier of data cell 122. Data cell 126 links down or relatively lower in database hierarchy using its children field with respect to data cell 128. Data cell 128 is relatively lower in database hierarchy with respect to data cell 126. Data cell 126 has attributes defined by data cell 128. Link 130 is provided by children field 40 in data cell 126 containing the identifier of data cell 128. Data cell 132 links horizontally in versions database hierarchy using its versions field to data cell 134. Data cell 134 is earlier in time than data cell 132. Data cell 134 is a previous version of data cell 132 or, conversely, data cell 132 is a more recent version of data cell 134. Link 136 is provided by versions field 42 in data cell 132 containing the identifier of data cell 134.

The non-solid closed arrows, e.g., between data cell 120 and data cell 122, illustrates a linkage or relationship between a sub class data cell and a super class data cell. The solid closed arrows, e.g., between data cell 126 and data cell 128, illustrates a linkage or relationship between a parent data cell and a child data cell. The open arrows, e.g., between data cell 132 and data parent cell 134, illustrates a linkage or relationship between different versions of a data cell.

Figure 5:
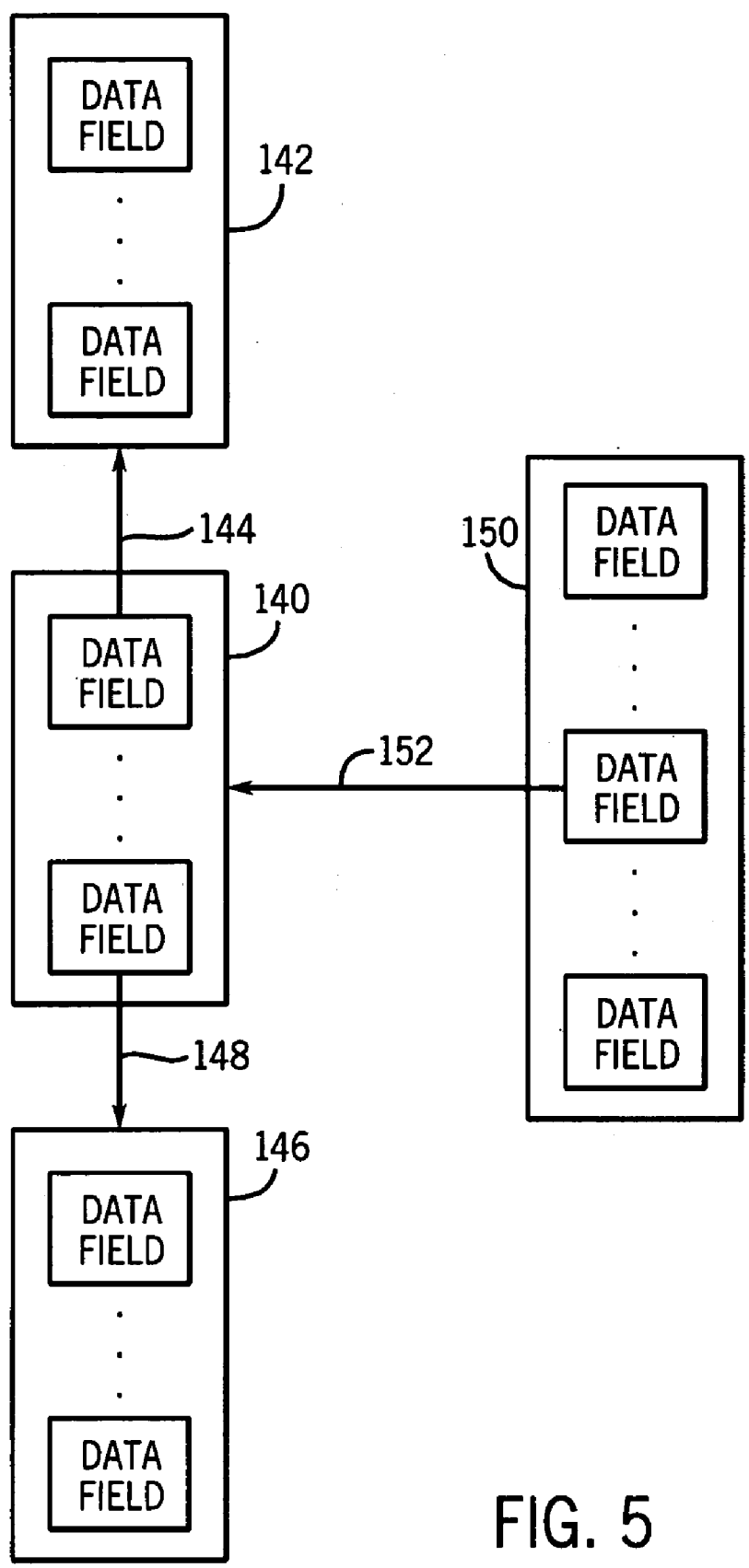
FIG. 5 illustrates generally data cells linking up for classes, linking down for children, and linking laterally for version.

In a more general fashion, FIG. 5 describes the types of linkages between the data cells of SODB 10. Data cell 140 links to data cell 142 by link 144. Data cell 142 is relatively higher in database hierarchy with respect to data cell 140. Data cell 140 is within the class hierarchy defined by data cell 142. Link 144 is provided by classes field 38 in data cell 140 containing the identifier of data cell 142. Data cell 140 links to data cell 146 by link 148. Data cell 146 is relatively lower in database hierarchy with respect to data cell 140. Data cell 140 has attributes defined by data cell 146. Link 148 is provided by children field 40 in data cell 140 containing the identifier of data cell 146. Data cell 150 links to data cell 140 by link 152. Data cell 150 is created later in time than data cell 140. Data cell 140 is an earlier version of data cell 150. Link 152 is provided by versions field 42 in data cell 150 containing the identifier of data cell 140.

Now consider the process of searching and retrieving information from SODB 10. The searching and retrieval function is contained within the application software resident on hard disk 54 of computer system 50. With the understanding that the data structure of SODB 10 is fixed and the contents of existing data cells do not change, the application software may perform a serial search of the database to find the information of interest. If the user is looking for a book by author Smith, SODB 10 may be sequentially scanned until data cells 78 and 94 are found. In data cell 98, author Smith has children 12 and 20 which are data cells 78 and 94.

A faster approach, especially for larger databases, involves pre-analyzing the contents of SODB 10 and building a search table. The search table exists on hard disk 54 in a file separate from the data cells. The search table will contain the identifiers of each searchable field. For example, the search table may contain the value of each name field with corresponding identifiers from classes and children and versions fields. The analysis of the contents of SODB 10 is done routinely to build and update the search table dynamically as the database changes. A pull down screen will show the higher classes, e.g., "vacation travel" and "pets". The user selects "vacation travel" and the next level of classes are shown in the pull down screen, e.g., "cruises" and "foreign". The search table knows that "cruises" and "foreign" are the next level down in database hierarchy from "vacation travel" because the classes field of data cells 64 and 66 (identifier 2) point to data cell 62. The user then selects "foreign" from the pull down screen. The book entitled "Germany" from data cell 94 is displayed because its children field 40 points to data cell 66. The user has found the desired information.

In another embodiment, the application software analyzes SODB 10 and builds an index table. For each identifier, the index table contains the identifiers from the classes field 38, the identifiers from children field 40, and the identifiers from versions field 42. The index table exists on hard disk 54 in a file separate from the data cells. The index table can be constructed and updated as the database changes. The index table will contain the identifiers to link up and down the different database hierarchies, and will locate different versions of the data cells, as necessary to find the desired data. The application software may use some combination of search tables and index tables.

The above described data structure of SODB 10 offers a number of advantages. First, the file structure is fixed and the same for each database. The user does not need to create a file schema, as is necessary for relational databases. The schema is contained within the recorded data of the data cells. The schema is expandable as new data cells are added to the database. The physical schema of the file used by the database is constant, and does not change. The logical schema used by the application is flexible, and encoded in the data itself. When the data is copied, so is its schema.

The common data cell structure makes SODB 10 transportable. Since the file structure is the same and the overall database can be readily changed by adding new data cells, the SODB is readily transported between organizations. The data cell structure of SODB 10 does not need to change to be usable by a different organization.

While the fundamental building block of SODB 10 always remains the same, the overall data structure of SODB 10 continues to grow and evolve using the same building block, i.e., the data cell. Unlike relational databases, SODB 10 does not require re-building or re-formatting with each major revision of the database, or merger with another database. New data cells can be added to redefine the interrelationship between the data elements, while maintaining its entire historical perspective. The basic structure of the data cell, and the manner of relating data cells, need never change, which makes SODB 10 easy to maintain.

In the case of merging two different database, which have been built using SODB 10, each database contains a plurality of data cells, wherein each data cell has a plurality of data fields which are similar for each data cell. The data cells of different levels of database hierarchy are related using values in the data fields. The data cells from one database are readily inserted or merged into the second database. Each new data cell is added without changes to schema or fundamental database structure. The new data cells from the first database simply link to one of the existing data cells in the second database.

All data cells are created by known and trusted users. Users keep private keys to themselves, which decentralizes authentication. The user's credentials are not stored in the database, only the proof of their credentials is stored in the database in the signature field. Since the authentication is stored with the data cells, when the data is copied, or replicated, the credentials move with the data.

SODB 10 has the ability to maintain the integrity of all records in the database. Since the contents of each data cell cannot be changed once inserted into the database, the entire historical record of SODB 10 is preserved. Data cells can be added to or deleted from SODB 10, but cannot be altered or changed once created. If any part of the data cell changes, the identifier becomes invalid because its value is hashed from the contents of the other data fields. Any attempt to change an existing data cell can be flagged as invalid or provided notice of an attempt to corrupt the database. Hence, SODB 10 is robust against covert, intentional, or unintentional corruption of the data.

Figure 6:
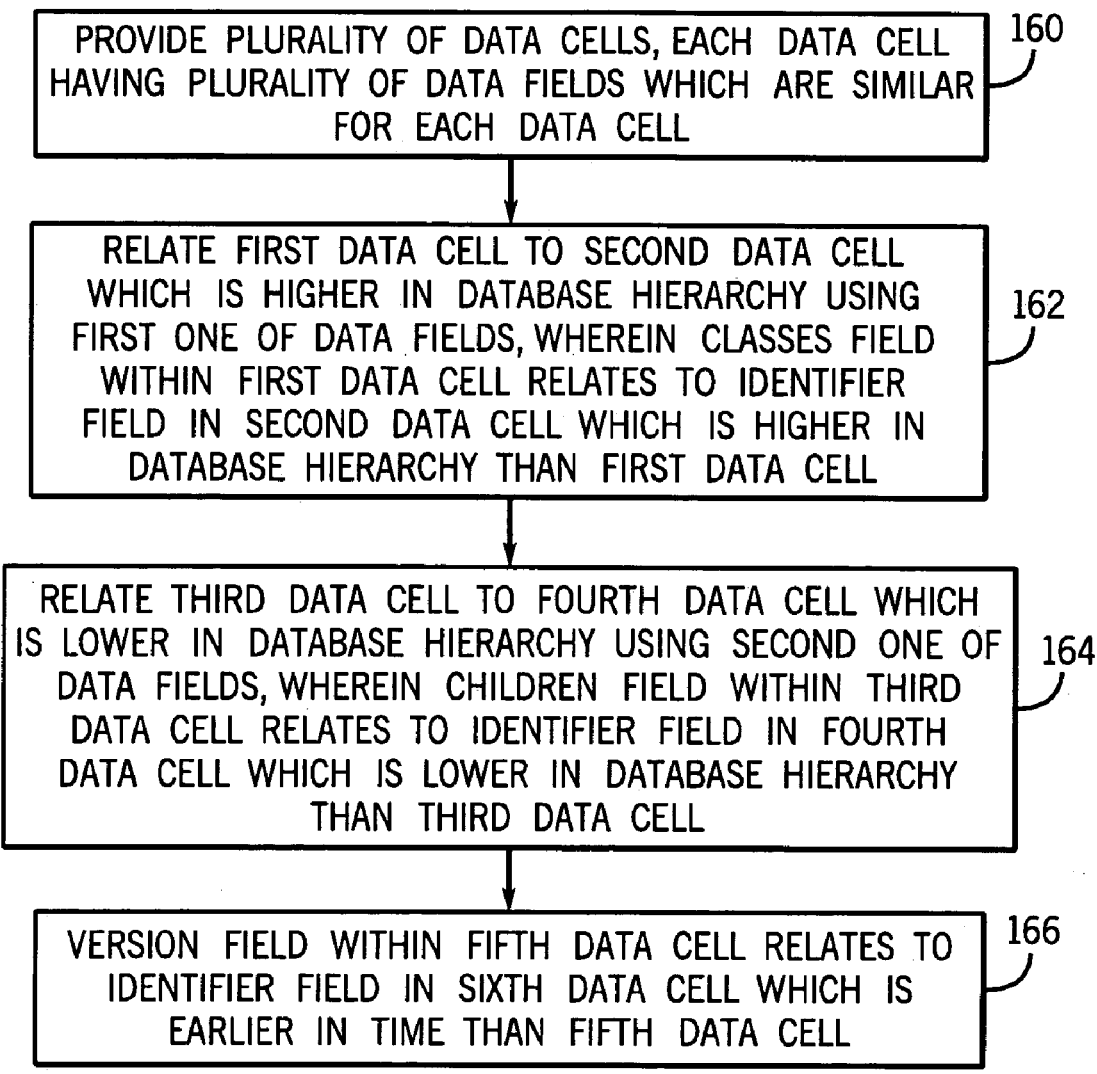
FIG. 6 illustrates the process of creating a symmetric objects database.

The process of organizing data in a symmetrical objects database in shown in FIG. 6. Step 160 provides a plurality of data cells. Each data cell has a plurality of data fields, which are similar for each data cell. The plurality of data fields include an identifier field, signature field, name field, value field, classes field, children field, versions field, user ID field, date field, and control flag field. Step 162 relates a first data cell to a second data cell, which is higher in inheritance hierarchy, i.e., from subclass to superclass, using a first one of the data fields. The classes field within the first data cell relates to an identifier field in the second data cell, which is higher in the inheritance hierarchy than the first data cell. Step 164 relates a third data cell to a fourth data cell, which is lower in the composition hierarchy (i.e., from whole to part) using a second one of the data fields. The children field within the third data cell relates to an identifier field in the fourth data cell, which is lower in the composition hierarchy than the third data cell. In step 166, the versions field within a fifth data cell relates to an identifier field in a sixth data cell which is earlier in time than the fifth data cell.

While one or more embodiments of the present invention have been illustrated in detail, the skilled artisan will appreciate that modifications and adaptations to those embodiments may be made without departing from the scope of the present invention as set forth in the following claims.

What is claimed is:

1. A computer implemented method of forming a symmetric objects database, comprising:

providing a plurality of linkable data cells that collectively defines the symmetric object database, each linkable data cell having a plurality of data fields which are identical for each of the plurality of linkable data cells, the plurality of data fields for each linkable data cell including at least an identifier field containing a unique value for identifying the linkable data cell determined by hashing values of other data fields in the linkable data cell, classes field for relating linkable data cells which are higher in database hierarchy, children field for relating linkable data cells which are lower in database hierarchy, and value field for containing data;

relating a first one of the plurality of linkable data cells to a second one of the plurality of linkable data cells through the classes field, wherein the second one of the plurality of linkable data cells is higher in database hierarchy than the first one of the plurality of linkable data cells; and relating a third one of the plurality of linkable data cells to a fourth one of the plurality of linkable data cells through the children field, wherein the fourth one of the plurality of linkable data cells is lower in the database hierarchy than the third one of the plurality of linkable data cells.

2. The computer implemented method of claim 1, wherein the classes field in the first one of the plurality of linkable data cells contains an identifier of the second one of the plurality of linkable data cells.

3. The computer implemented method of claim 1, wherein the children field in the third one of the plurality of linkable data cells contains an identifier of the fourth one of the plurality of linkable data cells.

4. The computer implemented method of claim 1, wherein one of the data fields in a fifth one of the plurality of linkable data cells relates to a sixth one of the plurality of linkable data cells which is earlier in time than the fifth one of the plurality of linkable data cells.

5. The computer implemented method of claim 4, wherein the plurality of data fields includes a versions field.

6. The computer implemented method of claim 5, wherein the versions field in the fifth one of the plurality of linkable data cells contains an identifier of the sixth one of the plurality of linkable data cells.

7. The computer implemented method of claim 1, wherein the plurality of data fields further includes a signature field.

8. The computer implemented method of claim 1, wherein the plurality of data fields include a name field, a signature field, a user ID field, a date field, and a control flag field.

* * * * *